United States Patent
Veenstra et al.

(10) Patent No.: US 8,380,189 B2
(45) Date of Patent: Feb. 19, 2013

(54) PREVENTING REGISTRATION OF A TERMINAL TO SERVICES IN A SERVICE PROVIDING NETWORK

(75) Inventors: Pieter Koert Veenstra, The Hague (NL); Colin Alonso Pons, Rotterdam (NL)

(73) Assignee: Koninklijke KPN N.V., The Hague (NL)

( * ) Notice: Subject to any disclaimer, the term of this patent is extended or adjusted under 35 U.S.C. 154(b) by 1003 days.

(21) Appl. No.: 12/409,232

(22) Filed: Mar. 23, 2009

(65) Prior Publication Data

US 2009/0238174 A1    Sep. 24, 2009

(30) Foreign Application Priority Data

Mar. 21, 2008 (EP) ..................................... 08005393

(51) Int. Cl.
*H04W 4/00* (2009.01)
(52) U.S. Cl. .................... 455/432.3; 455/414.1
(58) Field of Classification Search ............... 455/435.2, 455/518, 435.1, 456.5, 432.3, 414.1; 709/203, 709/226, 229; 370/352
See application file for complete search history.

(56) References Cited

U.S. PATENT DOCUMENTS

| | | | |
|---|---|---|---|
| 2005/0190772 A1 | 9/2005 | Tsai et al. | |
| 2005/0273855 A1 | 12/2005 | Oberle et al. | |
| 2006/0121916 A1* | 6/2006 | Aborn et al. | 455/456.5 |
| 2006/0176876 A1* | 8/2006 | Aborn et al. | 370/352 |
| 2006/0291484 A1 | 12/2006 | Naqvi et al. | |
| 2007/0088836 A1 | 4/2007 | Tai et al. | |
| 2008/0004061 A1* | 1/2008 | Takeda | 455/518 |
| 2008/0126541 A1 | 5/2008 | Rosenberg et al. | |
| 2008/0194258 A1* | 8/2008 | Chiu et al. | 455/435.1 |
| 2008/0215736 A1 | 9/2008 | Astrom et al. | |
| 2008/0305792 A1* | 12/2008 | Khetawat et al. | 455/435.1 |
| 2009/0191873 A1* | 7/2009 | Siegel et al. | 455/435.2 |
| 2009/0193071 A1* | 7/2009 | Qiu et al. | 709/203 |
| 2009/0238174 A1 | 9/2009 | Veenstra et al. | |

FOREIGN PATENT DOCUMENTS

| | | |
|---|---|---|
| EP | 1675347 A1 | 6/2006 |
| GB | 2 432 748 | 5/2007 |
| WO | 2005/027459 | 3/2005 |
| WO | 2008/074348 A1 | 6/2008 |

OTHER PUBLICATIONS

Jacobus A Ophoff et al, "Privacy-Enhancing Call Management in an IP-based Infrastructure", Computing in the Global Information Technology, 2006, pp. 42-47, International Multi-Conference on Bucharest, Romania,Piscataway, NJ.

(Continued)

*Primary Examiner* — Le H Luu
(74) *Attorney, Agent, or Firm* — McDonnell Boehnen Hulbert & Berghoff LLP

(57) ABSTRACT

A method is described for handling services in a service providing network. The network comprises a serving network node connected to one or more application servers. The method comprises the steps of a first terminal comprising one or more services, preferably VoIP services, sending a registration message to the serving network node associated with the user terminal; providing the serving network node in response to the registration message, with service routing information associated with the first terminal, the service routing information arranged to prevent registration of the first terminal to services residing on the application servers and corresponding with one or more services in the first terminal.

15 Claims, 5 Drawing Sheets

OTHER PUBLICATIONS

"Digital Cellular Telecommunications System (Phase 2+); Universal Mobile Telecommunications System (UMTS); IP Multimedia (IM) Subsystem Cx and Dx Interfaces; Signalling flows and message contents (3GPP TS 29.228 version 7.8.0 Release 7)", Global System for Mobile Communications, ETSI Standards, LIS, Jan. 2008, pp. 1-63, vol. 3-CN4, No. V7.8.0, Sophia Antipolis, Cedex, France.

European Search Report for EP08007994 mailed Oct. 7, 2008, pp. 1-8.

United States Patent and Trademark Office, Office Action for U.S. Appl. No. 12/428,897 mailed Aug. 29, 2012, pp. 1-13.

* cited by examiner

PREVENTING REGISTRATION OF A TERMINAL TO SERVICES IN A SERVICE PROVIDING NETWORK

FIELD OF THE INVENTION

The invention relates to handling services in a service providing network and, in particular, though not necessarily, to a method and a system for handling services in a service providing network, wherein a terminal connected to the service providing network comprises a predetermined number of services.

BACKGROUND OF THE INVENTION

Current service providing network systems, such as the IP Multimedia Subsystem as developed by the Third Generation Partnership Project (3GPP), are designed to provide IP Multimedia over mobile communication networks (3GPP TS 22.228, TS 23.218, TS 23.228, TS 24.228, TS 24.229, TS 29.228, TS 29.229, TS 29.328 and TS 29.329). For fixed broadband services, such as Voice over IP (VoIP), the ETSI TISPAN working group is further developing IMS (TS 29.229: IP Multimedia Call Control Protocol based on SIP and SD).

Within the IMS architecture the basic end-user subscription functions and the IP session management are decoupled from the specific VoIP service functions, e.g. number analysis, CLIP/R, Call Waiting, Call Barring, Call Waiting, etc. These services are handled within one or more application servers which reside in the network. IMS, which makes use of the Session Initiation Protocol (SIP) to set up and control client-to-client call services and client-to-server call services, provides the delivery of reliable VoIP services which meet the requirements regarding Quality of Services (QoS) and the regulatory demands for routing, privacy, security and legal interception.

FIG. 1 is a schematic of the registration process of a user terminal (EU) 102 comprising a SIP client (SIP AU) 104 to an exemplary IMS system 100. The core of the IMS may be formed by a set of Call/Session Control Functions (CSCF) comprising amongst others an Proxy-CSCF (P-CSCF) 106, an Interrogating-CSCF (I-CSCF) 108 and an Serving-CSCF (S-CSCF) 110. These functions may perform different tasks within the IMS core.

The P-CSCF 106 is the first contact within the IMS core and routes a SIP message (e.g. SIP INVITE) to the S-CSCF of a user. The P-CSCF may obtain its routing information during the registration to the IMS system. The I-CSCF 108 is located at the edge of a domain and identifies the correct S-CSCF for each incoming SIP request and forwards the request to that S-CSCF via an P-CSCF. Its IP address is published in the DNS of the domain so that remote servers can find it. The S-CSCF 110 performs the session control services on the basis of the service profile of the user. It may also act as a SIP registrar thus forming an important component for accessing and billing of IMS services.

The service profile stored in the Home Subscriber Service (HSS) 114 may contain service routing information thus determining the routing of SIP messages that are either originated from or addressed to a particular client or server. The user service profile is transferred to the S-CSCF over Cx in a standardized XML format.

The registration process as depicted in FIG. 1 may be initiated by the first user terminal (UE) sending a SIP REGISTER message via a Session Border Controller (SBC) 112 and the P-CSCF to the I-CSCF (step 1). The SBC may be used to control the data streams within one or more call session, e.g. signaling streams controlling the call, and one or more media streams which carry the call's audio, video, or other data along with information concerning how that data is flowing across the network. The I-CSCF may assign a S-SCSC to the UE by requesting information related to the user registration status from the HSS (step 2). The HSS provides the S-CSCF the required information in order for the I-CSCF to select a suitable S-CSCF. The I-CSCF then forwards the REGISTER message to the selected S-CSCF (step 3). The S-CSCF thereafter authenticates the user and informs the HSS—after successful authentication—that the user is registered (step 4). In return, the HSS provides the S-CSCF with the service profile of the user (step 5). On the basis of the information in the user service profile, the S-CSCF then may register the user with one or more application servers by sending a REGISTER message to the application servers 116 identified by a set of initial Filter Criteria (iFC). These iFC's may be contained in the user service profile or in a separate database (step 6). This way each application server may receive specific user configuration information which is needed for delivering a service hosted on the application server to the user.

An iFC may comprise information which determines whether or not a SIP message should be routed to a service located in a particular application server. The iFC may be defined in the standard in paragraph B.2.2 of document TS 129 228, which is hereby incorporated by reference in this application. An iFC may comprise a Trigger Point, i.e. a Boolean flag determined by a set of conditions and the SIP URI of an application server the SIP request should be routed to in case a received SIP message fulfils the condition(s) set by the Trigger point (Trigger point is TRUE), In case the Trigger Point is FALSE, the SIP message will not be routed to the application server comprising the service identified in the iFC. One or more Trigger Points are also referred to as trigger point information.

FIG. 2 provides a schematic of a VoIP call session (after registration) involving an originating call service (number normalization). A first user terminal UE-A and second user terminal UE-B (202,204) may be registered to a first IMS core and second IMS core respectively (206,208). Each user terminal may comprise a SIP client and has an associated S-CSCF (210,212), which is registered to one or more applications servers (214,216).

The call session may be initiated by the first user terminal UE-A 202 sending an SIP INVITE to the second user terminal UE-B 204. The SIP INVITE is routed via the SBC and the P-CSCF to the S-CSCF serving UE-A (step 1). The header of the SIP message may contain the requested URI (R-URI) of the called party UE-B at the terminating side.

Thereafter the S-CSCF of UE-A may execute the service profile of UE-A containing a set of services to which UE-A is subscribed to and which determines which services in the one or more application servers should be "included" during the establishment of the SIP session. In this case the SIP message is routed to a VoIP service: number normalization service, which transforms the local number 3434343 into a normalized number +31703434343 format (step 2). Hence, the normalization service replaces the original R-URI: 3434343 in the SIP header section by a modified R-URI: +31703434343 comprising the normalized telephone number (step 3).

The modified R-URI may be resolved using ENUM and DNS 218 in an URI of an I-CSCF of the IMS network of UE-B (step 4). Thereafter, the I-CSCF forwards the SIP message on the basis of the information retrieved from the HSS to the S-CSCF serving UE-B (step 6). The S-CSCF of UE-B may execute (in a similar way as described above in relation with the S-CSCF serving UE-A) the service profile of UE-B comprising a list of iFCs corresponding to a set of services, which UE-B is subscribed to. Depending on the service profile, the S-CSCF may route the SIP message via an application server in which a number of VoIP call services are located, to UE-B. Alternatively, the service in the application server may be a terminating service acting as an endpoint for the SIP request or an intermediate (forwarding) service, e.g. Call Forwarding, wherein the S-CSCF routes the SIP message to yet another (third) user terminal UE-C.

Although IMS enables a large amount of multimedia services, it also has disadvantages, especially within the context of VoIP. Within the IMS standard, VoIP is only described in combination with the use of application servers in the network. The application servers hosting the VoIP services however may require configuration data for each service. Further, the basic call flow in FIG. 2, clearly illustrates that the establishment of a call session requires a substantial amount of SIP messaging to be exchanged between the various clients and servers involved. Moreover, the capacity of the application servers is dependent on the number of subscribers to the services, while the capacity of IMS system scales with the volume of data traffic. Hence, the dimensioning of the network resources in such conventional IMS system is complex and based on forecasts of the VoIP service behavior of the users is needed. In addition an operator may want to differentiate between subscribers that do not wish to use (all) the VoIP services provided via IMS application services, for example because their terminals have these capabilities, and those that do want the VoIP services. It may even be beneficial to be able to offer different subscriptions depending on the amount of network services a user (identity) is subscribed to.

SUMMARY OF THE INVENTION

It is an object of the invention to reduce or eliminate at least one of the drawbacks of service handling in a service providing network known in the prior art and to provide in a first aspect of the invention a method of handling services in a service providing network. The network comprises a serving network node connected to one or more application servers. The method comprises the steps of a first terminal comprising one or more services, preferably VoIP services, sending a registration message to the serving network node associated with the user terminal;

providing the serving network node in response to the registration message, with service routing information associated with the first terminal, the service routing information arranged to prevent registration of the first terminal to services residing on the application servers and corresponding with one or more services in the first terminal.

In a further embodiment of the method according to the invention, the registration message comprises service availability information of the first terminal and the step of providing service routing information, comprises a step of modifying existing or generating new service routing information based on said service availability information. The service availability information tells the serving network node which of the services available on the terminal, are not to be delivered via an application server of the network. Based on this info the serving network node may modify existing routing information, to prevent these network services from being used. The advantage of this embodiment is that the adjustment may be directly implemented, and no interaction between a user and an administrator is required. Also no re-registration is required. The process may be automated in the sense that the terminal automatically sends its capabilities to the serving network node, or quasi automated, whereby the user instructs the terminal to provide the service availability information.

In another embodiment of the method according to the invention, the step of providing service routing information comprises a step of the serving network node retrieving pre-configured service routing information from a database, the pre-configuring of the service routing information being performed in the network during a provisioning process and based on service availability information of the first terminal. In this embodiment the service availability information is provided during the service provisioning process, in an interaction between an administrator and a user. The administrator may be another human entering the service availability information via a terminal, or alternatively the user corresponding to the user identity and terminal, may enter the availability information himself via for instance a web-interface. The advantage of this solution is that no specific software on the serving network node, or terminal is required.

In an aspect of the invention, the service routing information comprises a user service profile and initial Filter Criteria (iFC), the user service profile being associated with one or more initial Filter Criteria (iFC).

The iFC's are essentially service routing rules, determining where certain services are located and if and when they need to be addressed/consumed. These iFC's may be part of a user service profile, which may be stored in a database such as a HSS. Alternatively the iFC's may be stored in a separate database, whereby through being associated with the corresponding user service profile, they may be retrieved and loaded on to the serving network node.

In a further aspect of the invention, the iFC's comprise of service trigger point information, wherein the service trigger point information of an iFC associated with a service corresponding to one of the services in the first user terminal is set to FALSE.

The trigger point information determines if and when a service message needs to be routed. If the trigger points are set to FALSE, it means they are not active and the routing information contained in the iFC may not be used to route the service message. By de-activating the trigger points corresponding to services that are present and to be consumed at the terminal, the corresponding services residing on the application servers in the network are not used.

In yet a further aspect of the invention, a terminal is provided, comprising means arranged to prepare and/or send service availability information to a serving network node, the service availability information being comprised in a service message, preferably a register message.

In a further aspect the invention relates to a serving network node in a service providing network, the network node being associated with a terminal, the terminal comprising one or more services, preferably VoIP services, the node comprising:

means for receiving a service message comprising service availability information from the terminal; and means for, in response to the receipt of the service availability information, providing service routing information arranged to prevent registration of the first terminal to services residing on the application servers, that correspond with one or more services in the first terminal.; and means for executing the service routing information in response to the receipt of a service message.

The providing (or establishing) of this service availability information may be the modification of existing service availability information. It may be advantageous to provide the serving network node with means that merely have to deactivate or activate existing trigger points based on incoming service availability information, for reasons of simplicity.

In a further embodiment of the invention, the above described network node is further arranged to provide said service routing information to a database in the network, preferably a HSS. This is advantageous when the newly established or modified service routing information needs to be permanently stored, also after the user terminal (user agent) de-registers from the network. Upon the re-registration, the modified service routing information will then again be provided at the serving network node. This may also be advantageous when the user-identity (device) changes from S-CSCF.

In another embodiment according to the invention a system is provided for handling services in a service providing network, the network comprising a serving network node of the above described type, connected to one or more application servers arranged to provide, one or more services and at least one terminal of the above described type, connected to said serving network node.

It is a further object of the invention to reduce or eliminate at least one of the drawbacks of IMS call session handling known in the prior art and to provide in a further aspect of the invention a method of handling call services in IP Multimedia Subsystem (IMS), the IMS being connected to one or more application servers comprising a predetermined number of services. The method comprises the steps of: a first user terminal comprising a predetermined number of call services, preferably VoIP call services, sending a SIP register message to the S-CSCF serving the first user terminal; and the S-CSCF retrieving in response to the SIP register message the user service profile associated with the user terminal, the user service profile comprising one or more initial Filter Criteria (iFC) arranged to avoid registration of the first user terminal to the services corresponding to the call services in the first terminal.

The invention thus provides a simple IMS-based call handling architecture wherein a predetermined number of the VoIP call services do not reside in the network. The initial Filter Criteria in the user service profile are defined in such a way that a user terminal is not registered to services located in the application servers which correspond to the call services present in the user terminal. Such call handling architecture allows delivery of multimedia which meets the IMS standards regarding QoS, privacy, security and legal interception, while reducing the costs and complexity of the network. Moreover it drastically reduces the signaling load within the IMS core and the application servers. As all the required routing information is stored in the user service profile the invention can be easily implemented existing IMS architectures.

In one embodiment each initial Filter Criteria (iFC) comprises a Trigger Point, wherein the Trigger Point of an iFC associated with a call service corresponding to one of the services in the first user terminal is set to FALSE. Setting the Trigger Point to FALSE will instruct the S-CSCF serving the first user terminal not to route SIP messages to the Application Servers, which comprise call services corresponding to the VoIP call services in the first user terminal.

In a further embodiment the method further comprises the steps of: executing at the first user terminal an originating call service; sending in response to the execution of the service an SIP message to the S-CSCF; and the S-CSCF directly routing the SIP message to a second user terminal. This way originating services, preferably VoIP originating services, are executed at the user terminal, thus drastically reducing the signaling load within the IMS core and the application servers.

In yet a further embodiment the SIP message is a SIP INVITE message for inviting a second user terminal to a call session.

In still another embodiment the execution of the originating service is triggered by a request comprising an URI of a second user terminal. The request may be the request of the user providing an URI, e.g. a (local) telephone number of the called party.

In a further embodiment the originating service generates on the basis of the URI provided by the request an R-URI identifying the second terminal and wherein the R-URI is inserted in the header of the SIP message. The originating service executed in the user terminal may generate on the basis of the URI provided in the request a modified URI, which may be subsequently used by the SIP client in the user terminal. This way the SIP client may use the modified URI as an R-URI in header of a SIP message.

In one embodiment the method further comprises the steps of: receiving at the S-CSCF serving the first user terminal a SIP message; the S-CSCF directly routing the SIP message to the first user terminal; and the SIP message triggering the execution of a call service in the first user terminal. Hence, other services than originating services which are located in the user terminal may be executed at the user terminal location, thus drastically reduces the signaling load within the IMS core and the application servers.

In one embodiment the call service executed in the first user terminal is a terminating call service.

In another embodiment the call service executed in the first user terminal is a forwarding call service. In that case the method further comprising the step of: the S-CSCF directly forwarding the SIP message to a second user terminal.

In yet another embodiment the SIP message received by the S-CSCF is a SIP INVITE message for inviting the first user terminal to a call session.

In a further embodiment the method further comprises the step of: the forwarding call service in the first user terminal replacing the R-URI in the header of the SIP message received by an R-URI identifying the second user terminal. Hence, the Call Forwarding services at the first user terminal modifies the R-URI of the SIP message.

In a further aspect the invention is related a Serving Call/State Control Function node in an IP Multimedia Subsystem (IMS). The node is associated with a user terminal, comprising a predetermined number of services, preferably VoIP services and comprises: means for receiving a SIP message from the terminal; means for sending an SIP message to the terminal; means for receiving and storing a user service profile associated with the user terminal, the user service profile comprising one or more initial Filter Criteria (iFC) arranged to avoid registration of the first user terminal to the services corresponding to the services in the first terminal; and means for executing the iFC in response to the receipt of a SIP message.

In one embodiment of the Serving Call/State Control Function node each initial Filter Criteria (iFC) comprises a Trigger Point and wherein the Trigger Point of an iFC associated with a call service corresponding to one of the call services in the first user terminal is set to FALSE.

In yet another aspect the invention relates to a system for handling call services in IP Multimedia Subsystem (IMS), the IMS being connected to one or more application servers comprising a predetermined number of services and at least one user terminal, the user terminal being served by a Serving Call/State Control Function node according as described above.

The invention also relates to a computer program product handling call services in IP Multimedia Subsystem (IMS), the computer program product comprising software code portions configured for, when run in a telecommunications network, executing the method of handling call services in IP Multimedia Subsystem (IMS) as described above.

The invention will be further illustrated with reference to the attached drawing, which schematically show embodiments according to the invention. It will be understood that the invention is not in any way restricted to these specific embodiments.

DETAILED DESCRIPTION

An user identity is represented in an IMS network by an user agent (also referred to as SIP client), which may be located in a user device (also referred to as user terminal or UE) associated to the user identity or elsewhere in the network. The user agent acts on behalf of the user device, for example registers the device in the network. Invoking a service in an IMS network may comprise reception of a service request originating from a user agent at the S-CSCF. An URI of a service resource (e.g. application server) may be specified in the service request. The S-CSCF then forwards the service request to the application server hosting the requested service. For this purpose, the S-CSCF has a number of "initial Filter Criteria" implemented, which allow a decision to which application server to forward the received SIP message representing the service request.

The S-CSCF may also be referred to as serving network node or, because it performs a routing functionality, more generally referred to as a service routing node.

An application server may be more generally referred to as a service hosting node. These terms may be used in an equivalent manner.

Figure 3:
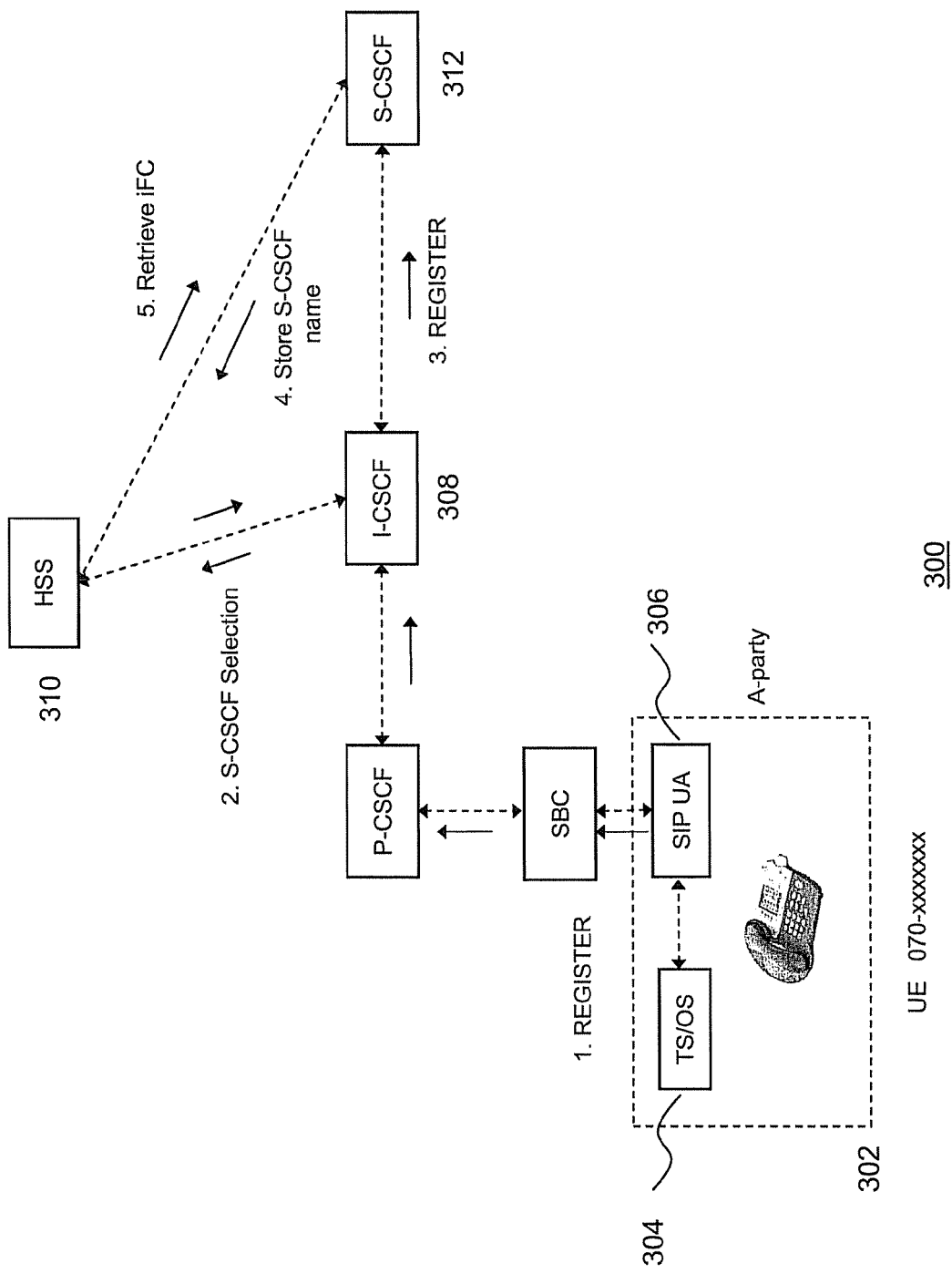
FIG. 3 depicts an exemplary embodiment of the invention.

FIG. 3 depicts a schematic flow diagram of a registration procedure 300 according to one embodiment of the invention. A first user terminal (UE) 302 may comprise a SIP client 304 (also referred as an SIP User Agent or SIP UA) and functional unit 306, comprising one or more of originating, intermediate and/or terminating services, preferably VoIP specific services, e.g. number normalization, Caller ID Blocking, Call Forwarding (conditional, no answer, busy), Calling Line Identification Presentation (CLIP), VoiceMail, Call Return Busy Destination, Call Waiting, Conferencing, Call Hold, etc. These services may be implemented in the terminal as software program executed in the memory of the terminal, as a hardware module (e.g. one or more chipsets providing the desired service) or a combination of thereof.

Alternatively the services, may be related to multimedia services, such as (interactive) television, Content on Demand or videophone services. In general the invention may apply to all services that may be made available to users through application servers, and may be part of an operators basic service offering, but alternatively may also be provided by the terminals themselves. In the latter situation, terminals with the right service capabilities are needed. Other examples of such services besides the basic VoIP services, may be virus scanners, parental control functionality (content filtering or blocking), or basic firewall or proxy services.

The user terminal may be an IP telephone or, alternatively, the user terminal may be "soft" IP phone, i.e. a computer program executed on a personal computer, a personal digital assistant (PDA) or a smart phone providing the functionality of telephone.

Alternatively, in case of services related to multimedia services, the user terminal may be a device capable of providing multimedia services to the user, such as a television, a television-set-top box combination, a home gateway.

To that end the terminal may comprise an Operating System (OS) for managing the resources of the mobile device, e.g. one or more Central Processing Units (CPUs), memory for storing program instructions and data and Input/Output (I/O) devices such as the radio module. Further, the OS may comprise Application Programming Interfaces (APIs) through which one or more application program, may access services offered by the OS. The OS may comprise APIs for setting up wired or wireless connections to a communications network, such as an IMS network.

Figure 1:
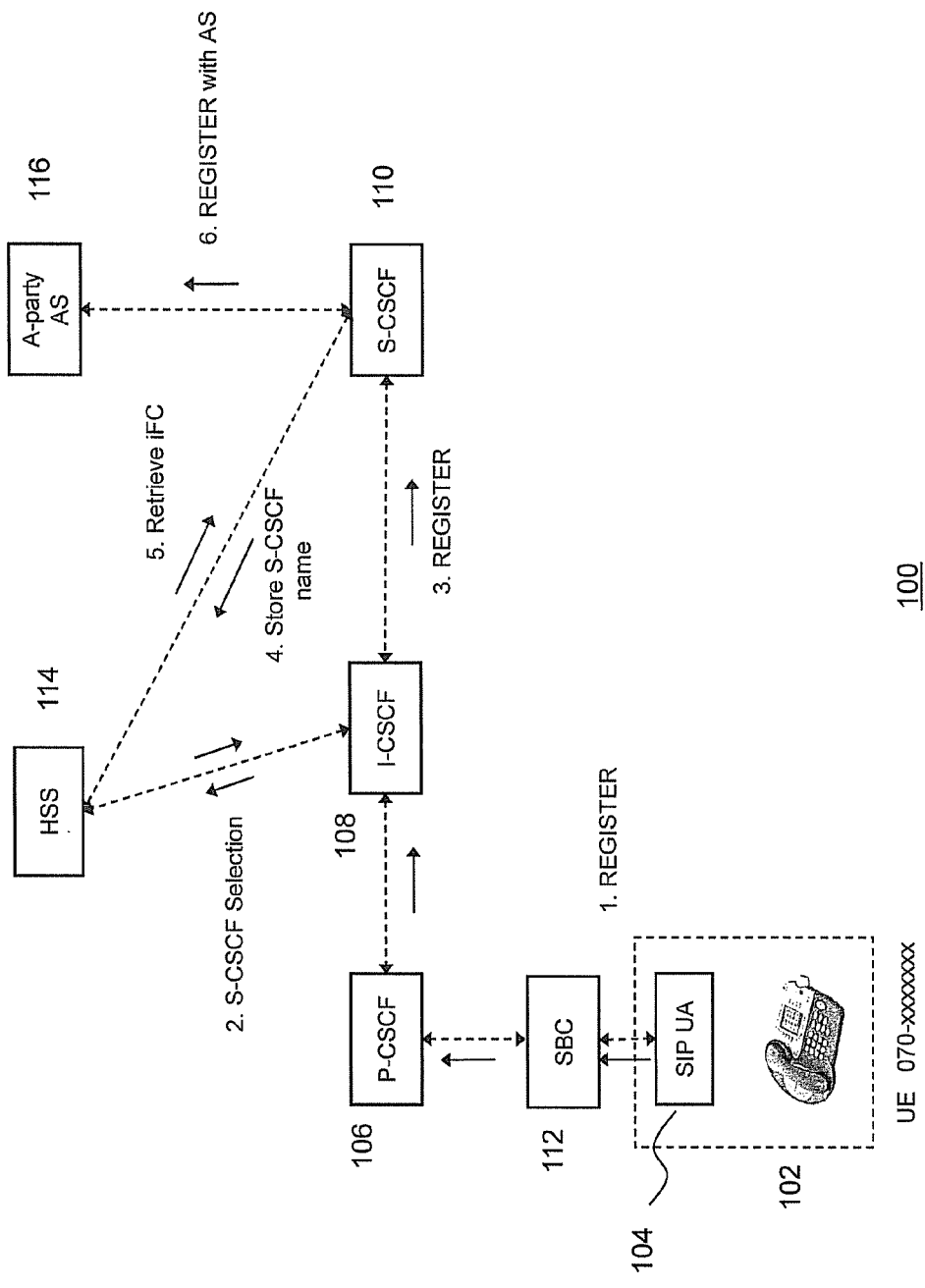
FIG. 1 depicts a schematic flow diagram of a registration process in a convention IMS.
Figure 2:
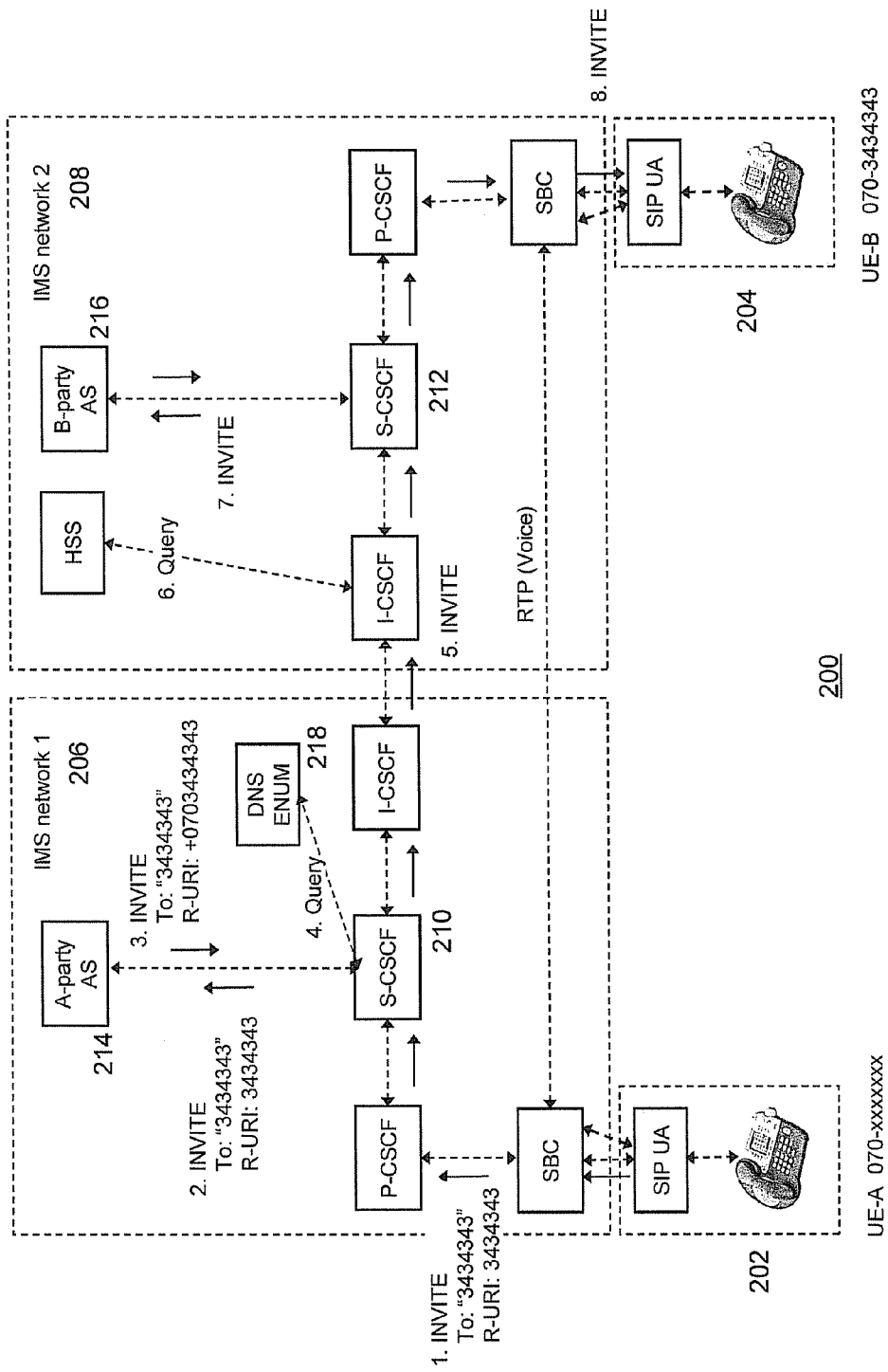
FIG. 2 depicts provides a schematic flow diagram of a basic call session in a convention IMS.

Similar to the registration process described in relation with FIG. 1, UE may send a registration messages, e.g. a SIP REGISTRATION message, via the SBC and the P-CSCF to the I-CSCF 308 (step 1). The I-CSCF selects on the basis of the information provided by the HSS 310 a suitable S-CSCF (step 2). The register message may then be forwarded to the S-CSCF 312 serving UE-A for authenticating the user (steps 3 and 4).

After authentication of the user, the S-CSCF may inform the HSS that the user has been successfully registered. In return the HSS may provide the S-CSCF with service routing information which may be contained in or associated with the service profile of the user (step 5). On the basis of the service routing information in or associated with the user profile, the S-CSCF may register the user with one or more services in the one or more application servers by sending a register message (such as a SIP REGISTER message) to the application servers identified in the service routing information. The services may be identified by a set of initial filter criteria (iFC) in or associated with the user service profile.

These iFC are comprised in the service routing information and may generally be regarded as service routing rules. These rules basically comprise a filter part and a decision part, wherein the filter part comprises the so-called Trigger Points, defining one or more filter criteria which are applied to incoming service messages. The decision part specifies the action(s) to be taken when the incoming message matches with the filter criteria of the rule. The TPs indicate the points in the session control signaling on which filter criteria may be set. For example, a filter criterion may be set on an initial incoming service message such as a SIP REGISTER or INVITE message and/or on the presence or content of one or more header fields in the message. A set filter criterion may then comprise, for example, a specific address (e.g., URI) of an application server. Filter criteria may be specific for a user identity and a given application server. Alternatively, filter criteria may be standardized and provided for all users identities as part of a standard service provisioning process. Filter criteria thus basically trigger sending a service-related message such as a service request message to a specific application server.

The scripts in the iFCs of the user service profile may instruct the S-CSCF to only register with the application servers hosting the services which are not present in the user terminal UE. In one embodiment, prevention of registration of these services may be achieved by setting the Trigger Points in the iFCs associated with the VoIP call services corresponding to the call or other services in the UE to FALSE. Hence, after registration, the iFCs in the service profile may determine the S-CSCF to route SIP messages via one or more application servers only when these servers host services which are not present in the user terminal.

Alternatively a standard set of iFC's may be modified during the provisioning process, based on provided service availability information that indicates which of the services available on the user device/terminal, are not required to be consumed from the network application servers. This modification may for example be a de-activation or removal of the obsolete iFC's related to one or all of the network services, that are also present at the user terminal. Part of the service provisioning process comprises administrative actions. For example, new iFCs may be entered and created at an OAM (Operation, Administration and Maintenance)-terminal by an administrator for a possibly large number of users. The creation of a new set of iFC's by modifying an existing standardized set of iFC's, may be based on service availability information, provided by the subscriber via a variety of communication media (webbased, phone, fax, email, SMS, USSD etc. ). After creation, the iFCs are transferred into the HSS (database) and stored in association with the corresponding user service profiles. These iFC's together with the user service profile(s) may then be loaded onto the S-CSCF in response to the user identity's registering attempt.

In a further embodiment this service availability information is not provided during the basic provisioning process, but is comprised in a register message, when the user device (via the user agent) registers with the network (see FIG. 3.)

A serving network node (service routing node) may comprise a reception component, which is adapted to receive from a terminal service availability information. The node further comprises a rule establishing component, which is adapted to establish a service routing rule based on the received service availability information. The node further comprises an extraction component, adapted to extract data from the service availability information for generating the service routing rule. The established rules may be stored in an internal service routing rule database. The service routing rules may have a flag associated with them, indicating if the rules are active or not (TRUE or FALSE). Establishing a rule in response to incoming service availability information may mean to change the corresponding flag in the database from a set (active) status to an unset status or vice versa. In a further embodiment of the invention, the node also comprises a transmission component, adapted to transmit the newly established service routing rule to a service routing rule database in the service providing network, for example a HSS. This may be important when the newly established rules need to be permanent and need to be preserved after de-registration.

The general content and format of a SIP REGISTER message is known to the skilled person, see for example the IETF (Internet Engineering Task Force) RFC (Request for Comment) 3261.

As part of the service availability information a terminal according to the invention may use one or more iFC-ID's as references for services available at the terminal and not to be used or consumed from the application server. These parameters may be pre-configured on the terminal, or may be provided during a first provisioning process. For passing the iFC-ID, a special parameter may be defined in the REGISTER message. This parameter may be placed in for instance a contact header field. The iFC-ID may uniquely identify the service at least for the services available at the terminal. In other embodiments, the iFC-ID may be unique within the service providing network. The terminal may then transmit the SIP REGISTER message to the S-CSCF. The occurrence of the iFC-id parameter in the Contact header field is interpreted by the S-CSCF as service availability information which triggers the modification (establishment) of service routing information (rules).

The terminal comprises an availability indication component, which is adapted to create service availability information. This component may be triggered internally, upon installing a new service or upon registration of the device in the network, or may additionally or alternatively be triggered by external signals, for example by manual input. The terminal may, as an example, prepare a registration message (e.g., a SIP register message) as an indication of service availability.

The service availability information is provided to a transmission component of the terminal, which may, for example, determine a network address of a serving network node in a service providing network and initiate transmission of the message including the service availability information to these serving network node.

Figure 4:
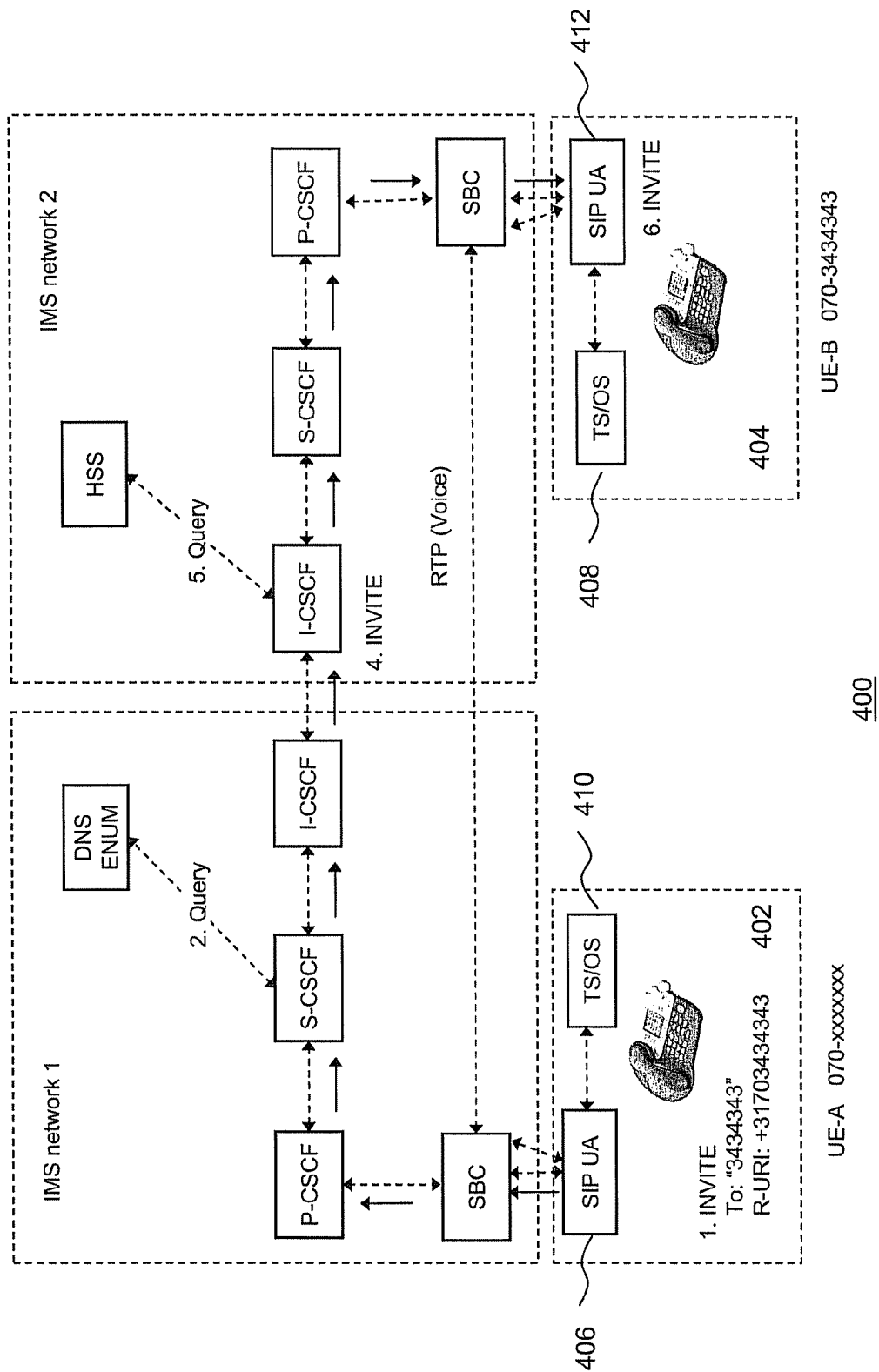
FIG. 4 depicts another exemplary embodiment of the invention.

A flow diagram of a basic VoIP call session 400 according to one embodiment of the invention, is schematically depicted in FIG. 4. Both the first user terminal UE-A 402 and the second user terminal 404 UE-B may comprise one or more originating and/or terminating VoIP services (406,408) connected to a SIP client (410,412).

User terminals UE-A and UE-B may be both registered to an IMS core via a registration procedure as described above in relation with FIG. 3. Hence, the user service profile associated with each user terminal may instruct its serving S-CSCF not to route SIP messages via application servers for the services which are already present in the user terminal. For each of these services the Trigger Point in its associated iFC is set to FALSE.

The process in FIG. 4 may be initiated with the first terminal UE-A receiving a request for a call. Such request may be initiated e.g. by the user dialing a local number 3434343 of the second user terminal UE-B. The request may trigger the VoIP number normalization service residing in the terminal. The executed service generates a normalized number of the user terminal UE-B, which subsequently may be inserted as an R-URI in the header of the SIP INVITE message generated by the SIP client of UE-A. The SIP message is then routed via the SBC and the P-CSCF to the S-CSCF serving the first user terminal UE-A.

On the basis of the user service profile, the S-CSCF may directly forward the SIP message to the I-CSCF of user terminal UE-B. No routing to an VoIP application server takes place. Similarly, the S-CSCF of the second user terminal UE-B may directly route the SIP INVITE message to the user terminal UE-B. Hence, configuring the iFCs associated with the user terminal according to the services present in the user terminal may result in a significant signaling load reduction in the network, especially with regard to the IMS core and the application servers.

Figure 5:
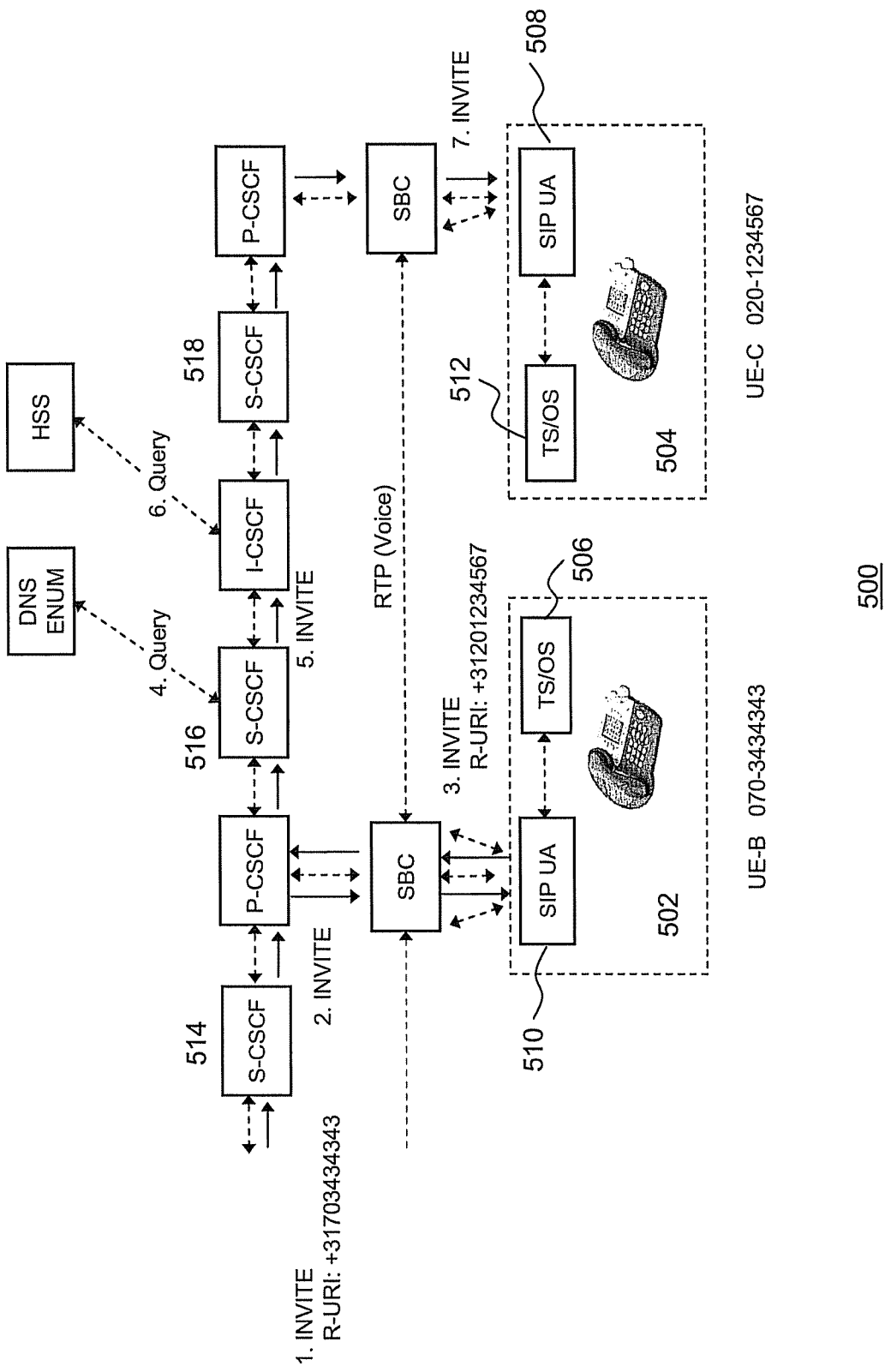
FIG. 5 depicts yet another exemplary embodiment of the invention.

FIG. 5 illustrates a flow diagram of a call session 500 representing a further embodiment of the invention. In this embodiment the S-CSCF serving the second user terminal UE-B 502 may receive an SIP INVITE from a first user terminal UE-A (not shown), wherein the SIP INVITE message comprises the R-URI of the called party UE-B (step 1). The S-CSCF serving UE-B 514 directly routes the SIP message to the SIP client of UE-B (step 2) without addressing the one or more application servers connected to the IMS comprising the call services in the second user terminal UE-B. In response to the reception of the SIP message, a Call Forward service in the user terminal B may be executed generating the R-URI of the client or the server the SIP message should be forwarded to (in this case a user terminal with number +31201234567). The SIP client of UE-B thereafter may send the SIP INVITE message with the R-URI identifying the third user terminal UE-C 504 to the S-CSCF serving UE-B 516 (step 3).

In response, the S-CSCF serving UE-B 516 may identify the I-CSCF of the third user terminal UE-C using ENUM and DNS and may directly forward the SIP INVITE message via the I-CSCF to the S-CSCF serving UE-C 518 (steps 4-6). The S-CSCF serving UE-C 518 subsequently forwards the SIP INVITE message on the basis of the user profile of UE-C to the SIP client of UE-C. Thereafter a call session between UE-A and UE-C may be established wherein the voice data are communicated over the connection using e.g. the RTP protocol.

It is to be understood that any feature described in relation to any one embodiment may be used alone, or in combination with other features described, and may also be used in combination with one or more features of any other of the embodiments, or any combination of any other of the embodiments. For example, in further embodiments, not all user terminals in the call session require call services to be present in the user terminal. The second user terminal UE-B in FIG. 4 or FIG. 5 and/or the third user terminal UE-C in FIG. 5 may be a conventional user terminal having a serving S-CSCF which routes the SIP messages via one or more VoIP call services located in one or more application servers connected to the IMS. Other variants include methods and systems wherein the number and/or type of call services in the one or more user terminals may be different, as it is the user service profile associated with each user terminal which determines whether or not a specific VoIP service is included in the routing of the SIP messages. Further, the invention is not limited to IMS but may also be implemented in a 3GPP Long Term Evolution (LTE) or 3GPP Service Architecture Evolution (SAE) networks.

Equivalents and modifications not described above may also be employed without departing from the scope of the invention, which is defined in the accompanying claims.

The invention claimed is:

1. A method of handling services in a service providing network, the service providing network comprising a serving network node connected to one or more application servers, the method comprising the steps of:
   a first terminal comprising one or more services sending a registration message to the serving network node associated with the first terminal;
   providing the serving network node, in response to the registration message, with service routing information associated with the first terminal, the service routing information arranged to prevent registration of the first terminal to services residing on the application servers and corresponding with one or more services in the first terminal.

2. The method according to claim 1 wherein the registration message comprises service availability information of the first terminal, and wherein the step of providing service routing information comprises a step of modifying service routing information based on said service availability information.

3. The method according to claim 1 wherein the step of providing service routing information comprises a step of the serving network node retrieving preconfigured service routing information from a database, the preconfiguring of the service routing information being performed in the network during a provisioning process and based on service availability information of the first terminal.

4. The method according to claim 3, wherein the service routing information comprises a user service profile and one or more initial Filter Criteria (iFC), the user service profile being associated with the one or more iFC.

5. The method according to claim 4, wherein the iFC comprises service trigger point information, wherein the service trigger point information of an iFC associated with a service corresponding to one of the services in the first user terminal is set to FALSE.

6. The method according to claim 5, the method further comprising the steps of:
   executing at the first terminal an originating call service;
   sending, in response to the execution of the service, a service message to the serving network node; and
   the serving network node directly routing the service message to a second terminal.

7. The method according to claim 6, wherein the service message is a SIP INVITE message for inviting the second terminal to a call session.

8. The method according to claim 7, wherein the execution of the originating service is triggered by a request comprising an URI of the second terminal.

9. The method according to claim 8, wherein the service generates, on the basis of the URI provided by the request, an R-URI identifying the second terminal.

10. The method of claim 9, wherein the R-URI is inserted in a header of the SIP INVITE message.

11. The method according to claim 1, the method further comprising the steps of:
    receiving at the serving network node of the first terminal a service message;
    the serving network node directly routing the service message to the first terminal; and
    the service message triggering the execution of a call service in the first terminal.

12. The method according to claim 11, wherein the call service executed in the first terminal is a terminating call service.

13. A serving network node in a service providing network, the serving network node being associated with a terminal, the terminal comprising one or more services, the serving network node comprising:
    a first software code for receiving a service message comprising service availability information from the terminal;
    a second software code for, in response to the receipt of the service availability information, providing service routing information arranged to prevent registration of the first terminal to services residing on one or more application servers, wherein the services correspond with one or more services in the first terminal; and
    a third software code for executing the service routing information in response to the receipt of the service message.

14. The serving network node according to claim 13, further arranged to provide said service routing information to a database in the service providing network.

15. The serving network node of claim 13, wherein the serving network node is part of a system for handling services in the service providing network, and wherein the serving network node is communicatively coupled to (i) the one or more application servers, and (ii) the terminal.

* * * * *